US006948472B2

(12) United States Patent
Suzuki et al.

(10) Patent No.: US 6,948,472 B2
(45) Date of Patent: Sep. 27, 2005

(54) ARRANGEMENT STRUCTURE FOR A MOTORCYCLE IGNITION SWITCH APPARATUS, AND MOTORCYCLE INCORPORATING SAME

(75) Inventors: Koji Suzuki, Saitama (JP); Yoji Kanaoka, Saitama (JP); Kenji Morita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/848,835

(22) Filed: May 19, 2004

(65) Prior Publication Data

US 2004/0256204 A1 Dec. 23, 2004

(30) Foreign Application Priority Data

Jun. 12, 2003 (JP) ....................................... 2003-168244

(51) Int. Cl.[7] ............................. F02P 3/00; B62D 21/00

(52) U.S. Cl. ............... 123/198 D; 123/647; 123/195 R; 123/195 E; 180/311; 180/220

(58) Field of Search ......................... 123/195 A, 195 E, 123/195 R, 198 D, 198 DC; 180/219, 220, 228, 311, 68.5, 634–635, 647

(56) References Cited

U.S. PATENT DOCUMENTS

| | | | | |
|---|---|---|---|---|
| 5,836,187 A | * | 11/1998 | Janssen et al. | 70/252 |
| 6,367,299 B1 | * | 4/2002 | Janssen et al. | 70/278.3 |
| 6,515,580 B1 | * | 2/2003 | Isoda et al. | 340/425.5 |
| 6,779,620 B2 | * | 8/2004 | Taniguchi et al. | 180/219 |
| 2004/0207516 A1 | * | 10/2004 | Ohtaki et al. | 340/438 |

FOREIGN PATENT DOCUMENTS

| | | | | |
|---|---|---|---|---|
| JP | 6-38785 | | 9/1990 | |
| JP | 2000-16365 | * | 1/2000 | B62J/9/00 |
| JP | 2002-87368 | * | 3/2002 | B62M/9/10 |

* cited by examiner

*Primary Examiner*—Hai Huynh
(74) *Attorney, Agent, or Firm*—Carrier, Blackman & Associates, P.C.; William D. Blackman; Joseph P. Carrier

(57) ABSTRACT

To improve the degree of freedom in attachment of an ignition switch apparatus, and to make the ignition switch apparatus less likely to be influenced by heat from an engine and by electrical noise interference, an ignition switch apparatus is provided including an antenna which performs radio communication for authentication with a transponder built in a key. The ignition switch is operatively attached to a pivot plate of the vehicle frame, on which a rear wheel is supported. In order to assure good communication with the key, the antenna is situated such that it projects from an outer face of a recessed portion of the pivot plate.

18 Claims, 6 Drawing Sheets

ARRANGEMENT STRUCTURE FOR A MOTORCYCLE IGNITION SWITCH APPARATUS, AND MOTORCYCLE INCORPORATING SAME

CROSS-REFERENCE TO RELATED APPLICATIONS

This present invention claims priority under 35 USC 119 based on Japanese patent application No. 2003-168244, filed Jun. 12, 2003.

BACKGROUND OF THE INVENTION

1. Field of the Invention

The present invention relates to an arrangement structure for a motorcycle ignition switch apparatus, to a frame component subassembly for use in a motorcycle, and to a motorcycle incorporating the described structure. More particularly, the present invention relates to an arrangement structure for a motorcycle ignition switch apparatus which has a high degree of freedom in attaching the ignition switch apparatus, and which is resistant to heat and electrical interference from an engine.

2. Description of the Related Art

Virtually all motorcycles sold today include an ignition switch apparatus, into which a key is inserted to switch vehicle power supply on and off. As an example of a conventional arrangement structure for the ignition switch apparatus, the ignition switch is attached to a main frame section which composes part of a vehicle body frame (refer to, for example, Japanese Utility Model Publication No. Hei 6-38785 (page 2, FIG. 1)).

In the example of an arrangement structure for an ignition switch apparatus of a motorcycle disclosed in the patent document mentioned above, the ignition switch apparatus is attached, through a guide tube, to one side of a main frame section extendingleftwardly and rightwardly rearwards from a head pipe.

Additionally, in recent years, a coded ignition switch apparatus for antitheft use has been developed, having a function of performing authentication with a transponder built into a key, and this type of coded ignition switch is being placed into increasing commercial use. Accordingly, it is possible to attach a coded ignition switch apparatus, which has a function of performing authentication with a transponder built in a key, to a main frame section of a vehicle body frame.

However, such a configuration as just described has the following problems.

Usually, since a main frame section of a motorcycle is formed with a small width, the degree of freedom in attachment of the ignition switch apparatus is limited. Further, since the main frame section is positioned in the proximity of the engine, the ignition switch apparatus is inevitably disposed near the engine, and is likely to be influenced by heat and by electrical noise interference from the engine.

SUMMARY OF THE INVENTION

The present invention has been made in view of the circumstances described above, and it is an object of the present invention to provide an arrangement structure for a motorcycle ignition switch apparatus which has a high degree of freedom in its attachment to a frame of the motorcycle, and which resists detrimental effects of engine heat and electrical interference.

In order to achieve the object described above, according to the invention as set forth in a first aspect of the invention, an arrangement structure for a motorcycle ignition switch apparatus is provided, wherein the ignition switch apparatus is operatively attached to a pivot plate of the vehicle body frame, on which a driving wheel is supported.

According to the invention as set forth in a second aspect hereof, the arrangement structure for a motorcycle ignition switch apparatus according to the first aspect is further characterized in that the ignition switch apparatus includes an antenna for performing radio communication, for authentication purposes, with a transponder built in a key for operating the ignition switch. The antenna may be disposed toward the outside of an outer face of the pivot plate.

According to the invention as set forth in a third aspect hereof, the arrangement structure for a motorcycle ignition switch apparatus according to the second aspect is further characterized in that an inner end portion of the antenna is disposed on a plane aligned with the outer surface of the pivot plate.

According to the invention as set forth in a fourth aspect hereof, the arrangement structure for a motorcycle ignition switch apparatus according to the first aspect is further characterized in that a circumference of the ignition switch apparatus is covered with a cover, and the cover has an extension portion which covers side faces of the antenna.

According to the invention as set forth in a fifth aspect hereof, the arrangement structure for a motorcycle ignition switch apparatus according to the fourth aspect is further characterized in that the cover also covers portions of the pivot plate which are adapted to be situated proximate a driver's legs.

According to the invention as set forth in a sixth aspect hereof, the arrangement structure for a motorcycle ignition switch apparatus according to the fourth aspect is further characterized in that the antenna acts as a coil which induces electric power for the transponder.

According to the invention as set forth in a seventh aspect hereof, arrangement structure for a motorcycle ignition switch apparatus is provided, for switching vehicle power on and off in a motorcycle, wherein the ignition switch apparatus is disposed below a seat on a vehicle body frame, in a region between an engine and a rear wheel axle.

According to the first aspect of the present invention, since the pivot plate is formed with an increased width from the necessity to assure a high rigidity in order to support the driving wheel and the ignition switch apparatus is provided on the pivot plate of the increased width, the degree of freedom in attachment of the ignition switch apparatus is raised.

Further, since the pivot plate is disposed at a position spaced away from the engine, when the ignition switch apparatus is attached to the pivot plate, the ignition switch is inevitably disposed at a position spaced away from the engine. As a result, the ignition switch is less likely to be influenced by heat of the engine, is less likely to be influenced by electrical interference from the spark plug of the engine as well.

Further, since the pivot plate has the increased width and besides has a great depth as described above, protection of a wiring system for the power supply, and related components associated with the ignition switch apparatus, is improved.

For a more complete understanding of the present invention, the reader is referred to the following detailed description section, which should be read in conjunction with the accompanying drawings.

DETAILED DESCRIPTION

An arrangement structure for a motorcycle ignition switch apparatus according to the present invention is described below with reference to the drawings.

Figure 1:
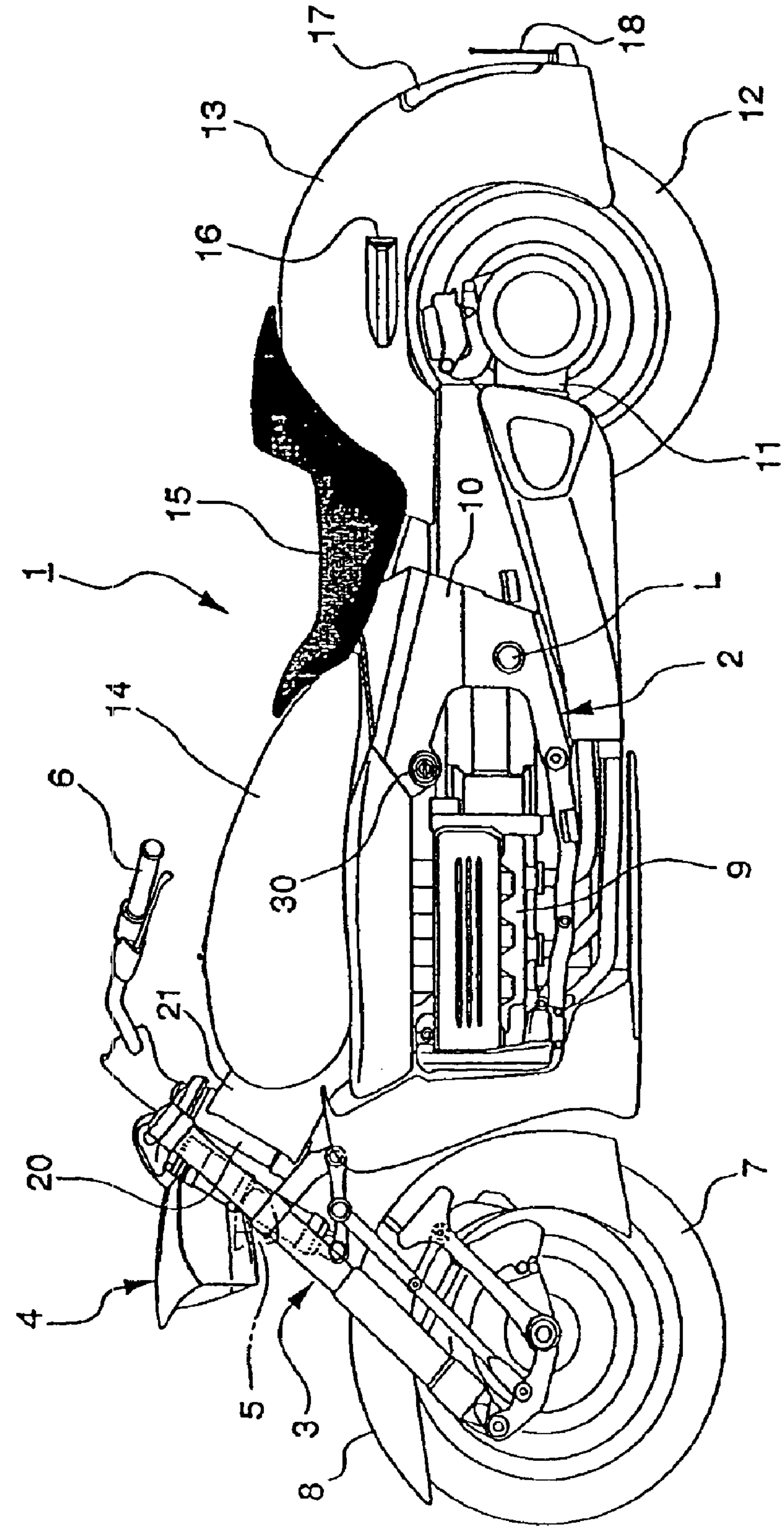
FIG. 1 is a side elevational view of a motorcycle, which includes an arrangement structure for an ignition switch apparatus according to a selected illustrative embodiment of the present invention.

FIG. 1 is a side elevational view of a motorcycle that includes an arrangement structure for an ignition switch apparatus according to a selected illustrative embodiment of the present invention. The motorcycle 1 shown in FIG. 1 is an example of an American type motorcycle, and includes a vehicle body frame 2, a link type front suspension 3, supported for pivotal motion at a front end portion of the vehicle body frame 2, and a headlamp device 4, provided at an upper portion of the front suspension 3. The motorcycle 1 further includes a pair of left and right front turn signals 5, provided on the lower side of the front suspension 3 with respect to the headlamp device 4, and a steering handlebar 6, attached to an upper end portion of the front suspension 3 at an upper front portion of the vehicle body frame 2.

The motorcycle 1 further includes a front wheel 7, supported for rotation on the link type front suspension 3, a front fender 8 supported on the link type front suspension 3 for covering the upper side of the front wheel 7, and an engine 9, of the horizontally opposed type, supported on the vehicle body frame 2. The motorcycle 1 further includes a rear swing arm 11 supported at a rear portion of the vehicle body by a pivot plate 10 of the vehicle body frame 2. The swing arm 11 is adapted for reciprocal rocking motion around an axial line L extending from the frame 2 in the leftward and rightward direction. The motorcycle 1 further includes a rear wheel 12, supported for rotation thereof at a rear end portion of the rear swing arm 11. The rear wheel 12 serves as a driving wheel, which is rotated by driving force of the engine 9. The motorcycle 1 also includes a rear fender 13, supported on the vehicle body frame 2, for covering an upper part of the rear wheel 12.

Furthermore, the motorcycle 1 includes a fuel tank 14, of the tear drop type, disposed at an upper portion of the vehicle body frame 2. A main seat 15 is disposed rearwardly of the fuel tank 14 for supporting a driver seated thereon, and left and right rear turn signals 16 are provided on opposite sides of the rear fender 13. The motorcycle 1 further includes a brake lamp 17 provided at a rear central portion of the rear fender 13, and a license plate 18 at a rear end portion of the rear fender 13, as shown.

Figure 2:
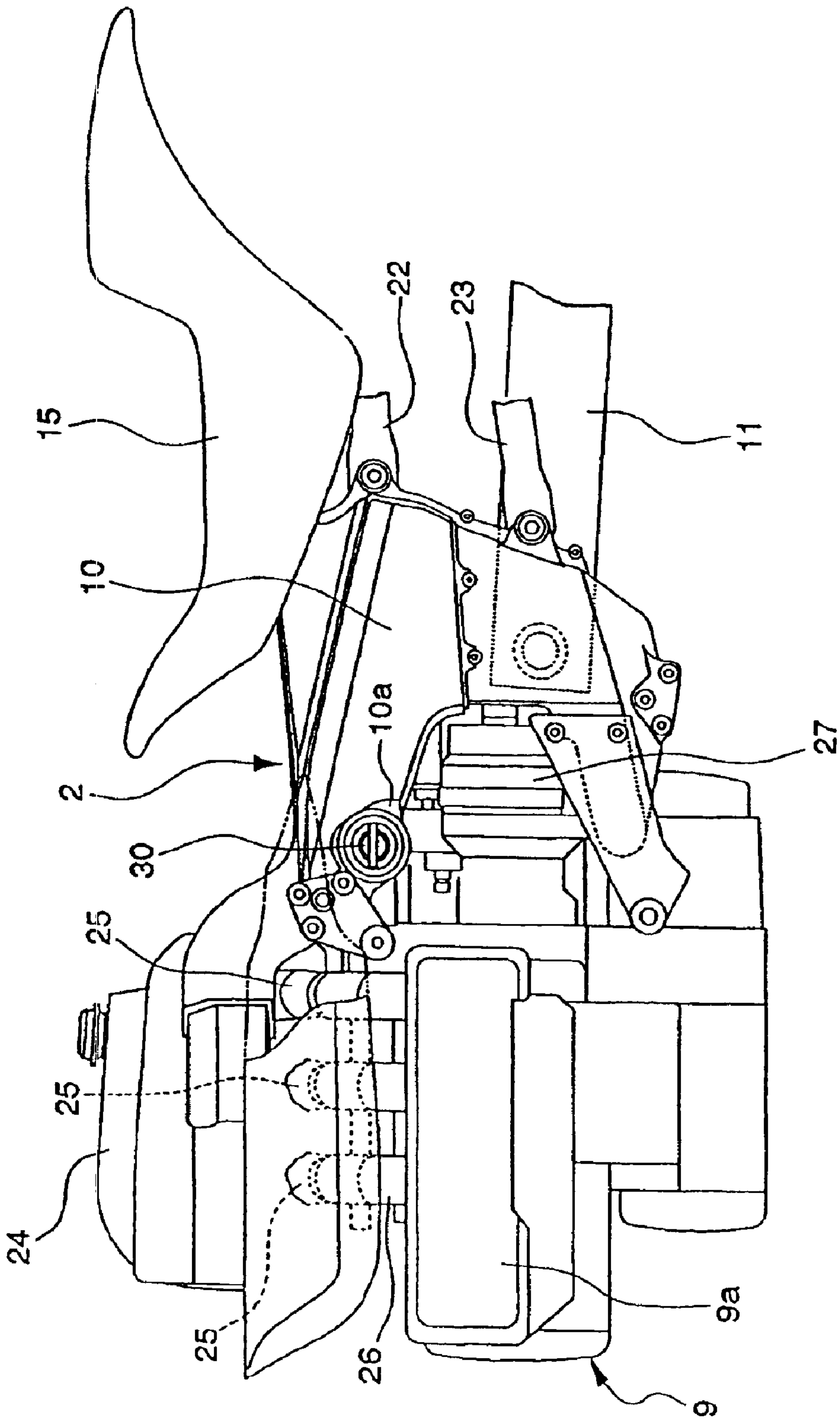
FIG. 2 is a side elevational detail view showing arrangement of the engine, vehicle body frame, main seat and related components of the motorcycle of FIG. 1.
Figure 3:
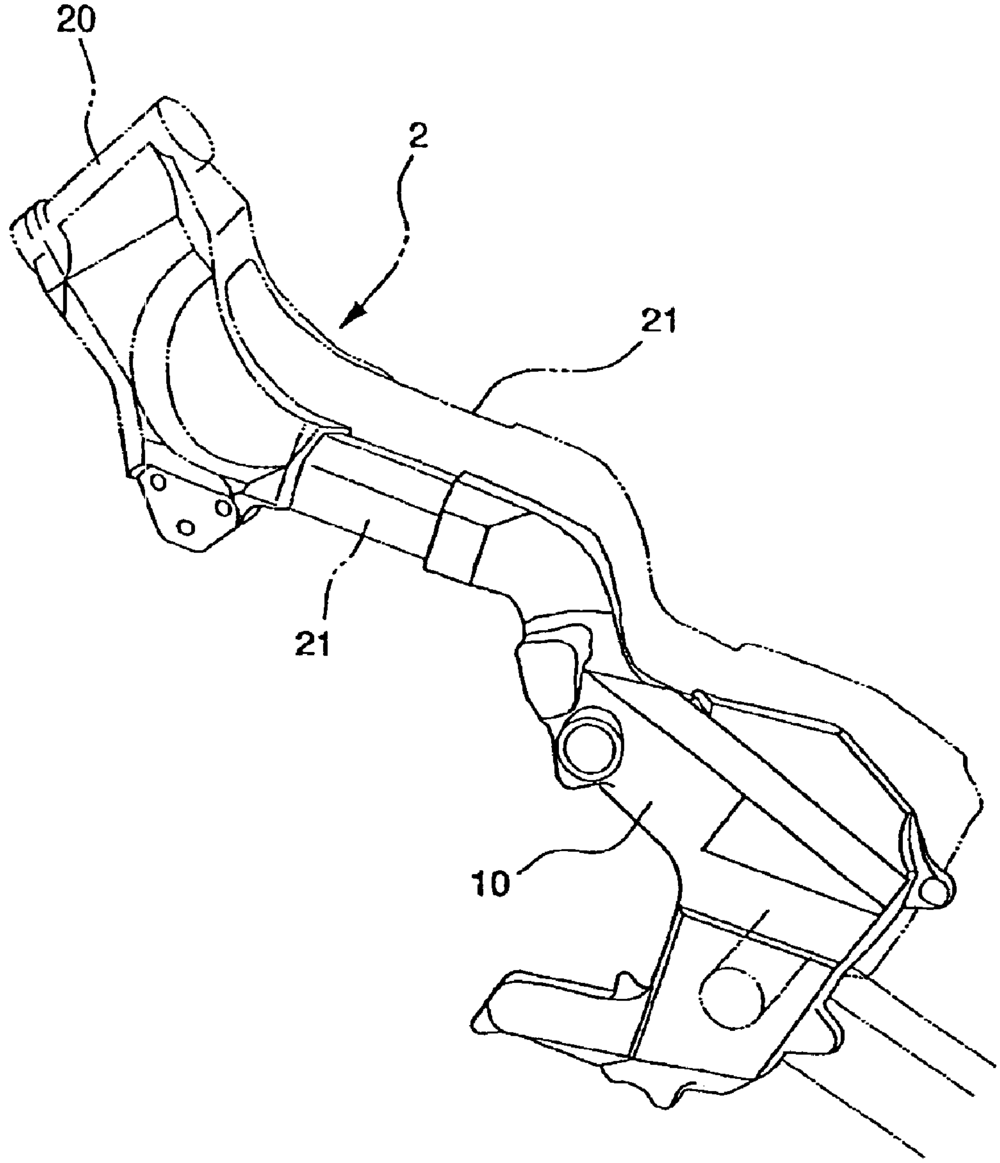
FIG. 3 is a detail perspective view illustrating a relationship between a main frame section and a pivot plate in the motorcycle of FIG. 1.

Referring to FIGS. 2 and 3, the vehicle body frame 2 includes a main frame section 21, extending leftwardly and rightwardly from a head pipe 20, and further extending obliquely rearwardly downward. The pivot plate 10 is attached to a rear end of the main frame section 21, and has a substantially U shape or truncated V shape as viewed in side elevation.

The vehicle body frame 2 further includes a seat rail 22, extending rearwardly from an upper rear portion of the pivot plate 10, and a reinforcement strut 23, extending obliquely rearwardly upward from a lower rear portion of the pivot plate 10, and connected to the seat rail 22.

In FIG. 2, reference numeral 24 denotes an air cleaner, which is connected to the engine 9 through cone tubes 25 and throttle bodies 26. Meanwhile, reference numeral 27 denotes an AC generator of the air-cooled type. Here, the components of the vehicle body frame 2, including the head pipe 20, main frame section 21, pivot plate 10 and related components are each respectively made of a metal material such as, for example, aluminum, aluminum alloy, or steel.

Figure 4:
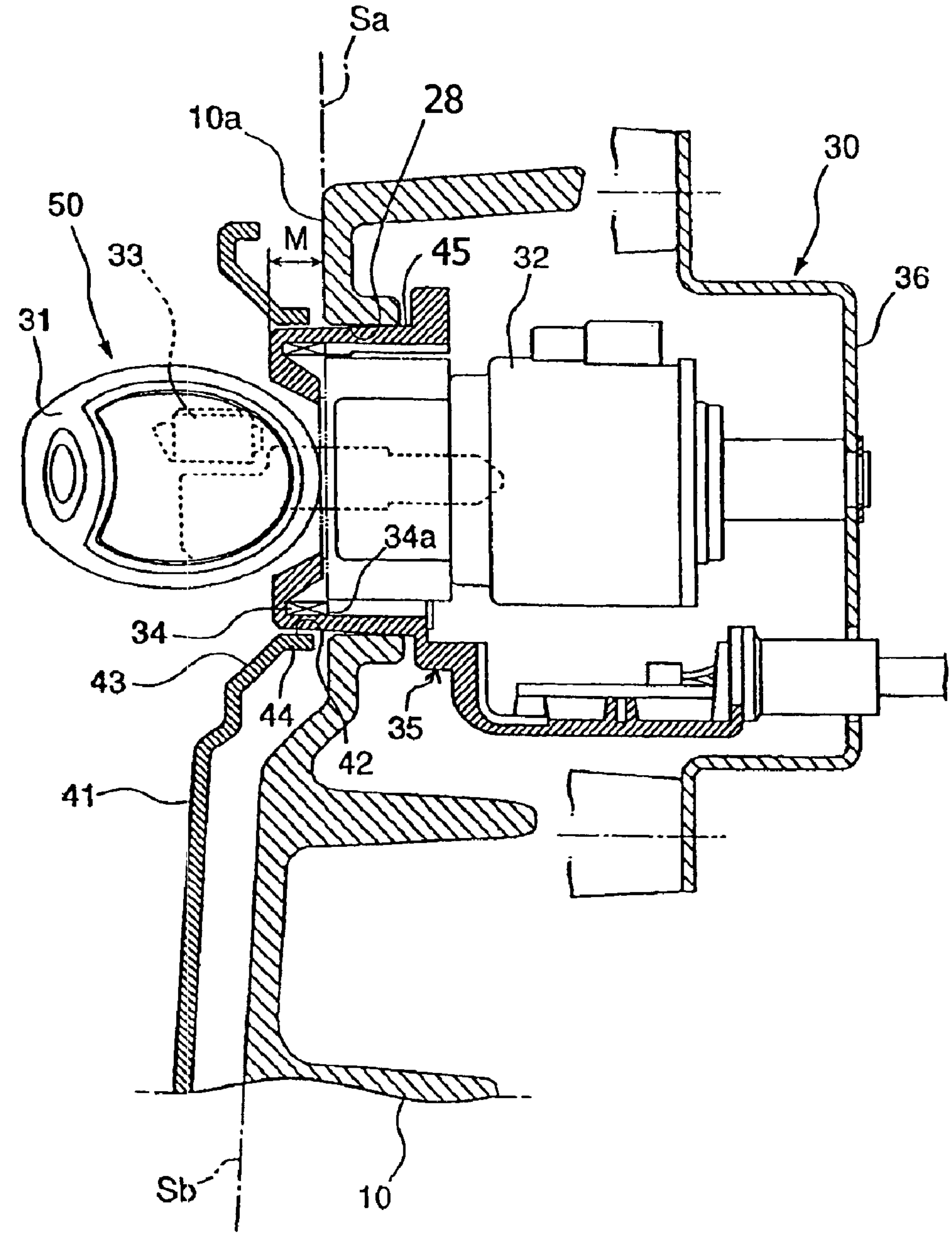
FIG. 4 is a sectional detail view showing an arrangement relationship of an ignition switch assembly and elements around the ignition switch assembly in the motorcycle of FIG. 1.

As shown in FIG. 4, a recessed portion **10*a* is formed at an upper front portion of the pivot plate 10, such that the recessed portion 10*a* is depressed toward the center of the vehicle body. A hole 28 is formed in the recessed portion 10*a*, such that the hole 28 extends in the leftward and rightward direction through the pivot plate 10**.

A lockable ignition switch apparatus 30 is inserted through the hole 28 from the rear side (inner side) of the pivot plate 10, as shown, so as to partly project from an outer face of the pivot plate 10. The lockable ignition switch apparatus 30 and a uniquely coded key 31 cooperate to define an ignition switch assembly 50.

Figure 5:
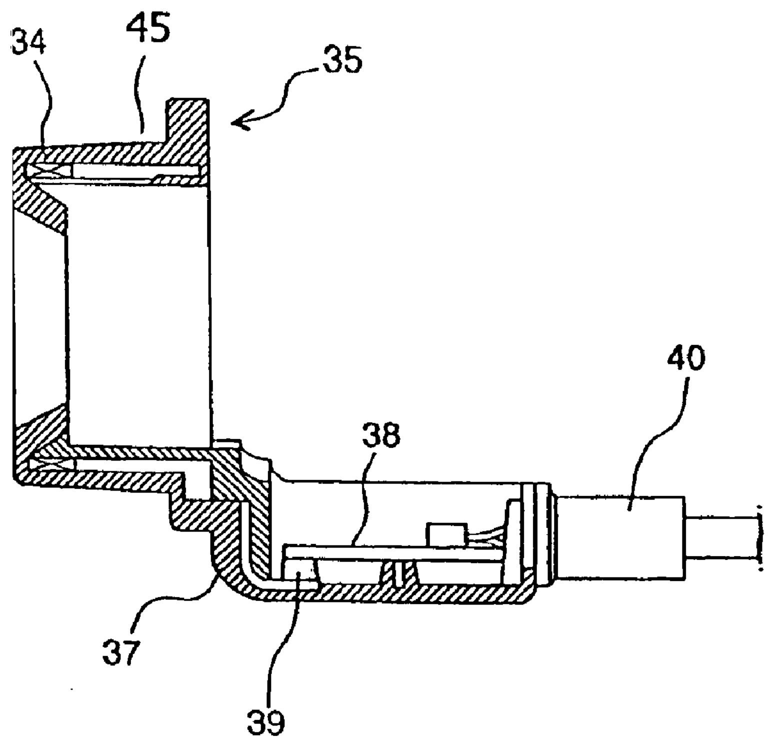
FIG. 5 is a side elevational detail view, partly in cross-section, showing a receiver unit of the ignition switch apparatus in the ignition switch assembly of FIG. 4.

As best seen in FIGS. 4 and 5, the ignition switch apparatus 30 includes a lock cylinder 32, for switching vehicle power on and off via a key 31 inserted therein. The ignition switch apparatus 30 also includes a receiver unit 35, including a cylindrical collar 45 and a shell portion 37 integrally attached to the collar. The cylindrical collar 45 is partly fitted around an outer end of the lock cylinder 32, and includes an inwardly folded outer edge portion. The shell portion 37 of the receiver unit 35 extends below and alongside the lock cylinder 32.

The receiver unit 35 also includes a substantially annular antenna 34, disposed inside the inwardly folded outer edge portion of the collar 45. The antenna 34 is provided for radio-communicating with a transponder 33 built into the key 31, for authentication thereof. The antenna 34 is used to remotely provide power to the transponder 33, as will be further described herein.

The ignition switch apparatus 30 further includes an attachment plate 36, fastened by a screw or other fastening structure to the back of the pivot plate 10. The attachment plate 36 is supportively connected to a rear end (right end in FIG. 4) of the lock cylinder 32, to secure the lock cylinder 32 and the receiver unit 35 at predetermined positions.

Referring to FIG. 5, the antenna 34 is disposed inside the cylindrical collar 45 of the receiver unit 35, which is fitted around an end of the lock cylinder 32. As noted, the shell portion 37 extends alongside and parallel to a side face of the lock cylinder 32. The antenna 34 performs radio communication for authentication with the transponder 33 built in the key 31, and also acts as an electromagnetic coil for inducing electric power to the transponder 33. In particular, the antenna 34 not only performs transmission and reception, for example, for verification of an ID code, but also remotely powers the transponder 33 of the key 31.

When the ignition switch apparatus 30 is attached to the pivot plate 10 through the attachment plate 36 or the like at a normal position, it is positioned such that the antenna 34 projects outwardly from an outer face Sa of the recessed portion 10*a* of the pivot plate 10.

In the embodiment shown in the drawing, an inner end portion 34*a* of the antenna 34 is disposed on a plane which coincides with the outer face Sa of the recessed portion of the pivot plate 10, as seen in FIG. 4. Further, when the ignition switch apparatus 30 is attached to the pivot plate 10 at the normal position, it is positioned such that a head portion of the ignition switch apparatus 30 is disposed at a position substantially aligned with the other outer face Sb, different from the recessed portion 10*a* of the pivot plate 10, or at a position a little retracted from the outer face Sb.

It is to be noted that, in FIG. 5, reference numeral 38 denotes a circle clip, 39 a terminal, and 40 a tube for covering a wiring cable.

Referring again to FIG. 4, reference numeral 41 denotes a cover that covers a circumference of the outer tip of the collar 45 of the ignition switch apparatus 30. The cover 41 is made of, for example, a synthetic plastic resin, and integrally covers side faces of an upper half of the pivot plate 10, which are adapted to be situated proximate the driver's legs.

The cover 41 has an opening 42 formed therein, to permit the tip of the collar 45 and a head portion of the ignition switch apparatus 30 to extend therethrough. The opening 42 of the cover lines up with the hole 28 in the pivot plate 10. In the proximity of the opening 42, a conical recessed portion 43 is formed, such that it is depressed along the opening 42, and a cylindrical extension portion 44 is provided on an edge of the opening 42, such that the extension portion 44 surrounds the tip of the collar 45 and the side face of the antenna 34.

A security and lock system, which includes the ignition switch assembly 50 formed from the ignition switch apparatus 30 and the key 31, along with an immobilizer unit incorporated in an engine control unit 51 and related components will now be described, with reference to FIG. 6.

The engine control unit 51 has a known immobilizer unit incorporated therein for determining, based on information transmitted from the transponder 33 in the key 31, whether or not the key 31 is unique to the vehicle.

Further, a lock unit 52, for locking the handlebar 6, is provided in the proximity of the handlebar 6. When a lock lever 53 is turned, a pulley 55 is rotated in its locking direction (clockwise direction in FIG. 6) through a lock wire 54, and when the pulley 55 rotates in the locking direction, the lock unit 52 operates a lock pin 56, connected to the pulley 55, to advance the pin 56 and to place the handlebar 6 into a locking state. A solenoid 57 is incorporated in the lock unit 52. If the solenoid 57 incorporated in this manner is energized when the lock unit 52 is in its locking state, then an arresting engagement of the pulley by a cam mechanism 58 is canceled to allow the pulley 55 to rotate in its unlocking direction (counterclockwise direction in FIG. 6), thereby to move the lock pin 56 back to release the handlebar 6.

It is to be noted that the pulley 55 is normally biased in an unlocking direction by a spring (not shown), and when the pulley 55 is in the locking state, the locking state is maintained against the biasing force of the spring by the cam mechanism 58.

The solenoid 57 of the lock unit 52 is connected to a battery power supply at a contact on one side thereof, and to the engine control unit 51 at another contact on the other side thereof. Further, the lock unit 52 includes a limit switch 59, for detecting whether the lock unit 52 is in the locking state or the unlocking state from a rotational position of the pulley 55. The limit switch 59 is connected at a contact on one side thereof to the battery power supply and at another contact on the other side thereof to the engine control unit 51.

Reference numeral 60 denotes a starter deactivation relay, and a coil 60*a* of the starter deactivation relay 60 is connected at a contact on one side thereof to the battery power supply, and at another contact on the other side thereof to the engine control unit 51. Further, a starter switch 61 is connected at a contact on one side thereof to the battery power supply through a switch 60*b* of the starter deactivation relay 60 and at another contact on the other side thereof to a clutch switch through a starter magnet coil 62.

An indicator 64 is connected to a meter 63 which, in turn, is connected to the engine control unit 51. The indicator 64 displays whether or not the lock unit 52 is in the locking state, as well as whether or not the power supply to the vehicle has been switched on by the ignition switch assembly 50.

Subsequently, operation of the arrangement structure is described for an ignition switch apparatus of a motorcycle, having the configuration described above.

Figure 6:
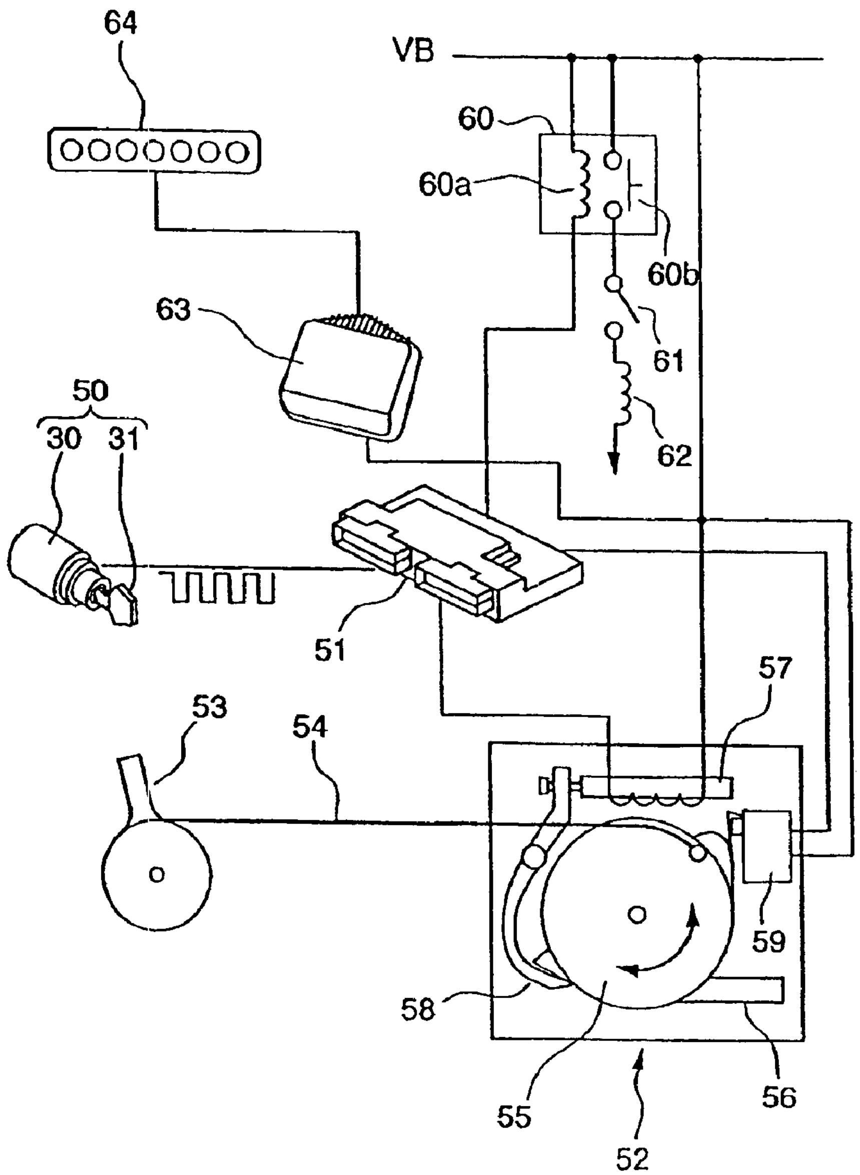
FIG. 6 is a schematic diagram illustrating a security lock system including an ignition switch assembly, an immobilizer unit and related components in the motorcycle of FIG. 1.

First, motion of the lock system shown in FIG. 6 is described briefly. The driver would operate the lock lever 53 to turn to a locked position when the driver leaves the vehicle, after driving of the vehicle is interrupted. Consequently, the pulley 55 is rotated in the locking direction through the lock wire 54, and upon the rotation of the pulley 55, the lock pin 56 is advanced to place the handlebar 6 into the locking state.

When the ignition switch is locked in this manner, if the driver wants to again drive the vehicle, then the driver would insert the key 31 of the ignition switch assembly 50 into the ignition switch apparatus 30 and then turn the inserted key 31 to the driving position. Consequently, the battery is connected to the power supply section, and the immobilizer unit incorporated in the engine control unit 51 operates. In particular, predetermined transmission data is produced by the immobilizer unit, and transmitted to the transponder 33 through the antenna 34 of the receiver unit 35. In response to the transmission data received, the transponder 33 produces an authentication signal, and the produced authentication signal is transmitted to the immobilizer unit through the antenna 34. The immobilizer unit determines whether or not the authentication signal coincides with an authentication code stored in advance in the immobilizer unit. In other words, the immobilizer unit determines, through the authentication signal, whether or not the key 31 is unique to the vehicle.

Then, if it is determined that the key 31 is unique to the vehicle, then a signal is transmitted from the engine control unit 51 to the solenoid 57 to energize the solenoid 57, to cancel the arresting engagement of the pulley 55 by the cam mechanism 58. Consequently, the pulley 55 is rotated in the unlocking direction by the biasing force of the spring (not shown), to open the lock unit 52. The information that the lock unit 52 is placed into the unlocking state in this manner is sent in the form of a signal to the engine control unit 51 through the limit switch 59.

After it is detected by the limit switch 59 that the lock unit 52 has been unlocked, the engine control unit 51 grounds the other side of the coil 60*a* of the starter deactivation relay 60 to turn on the switch 60*b* of the relay 60. In short, if the starter switch 61 is turned on, then a state is established wherein the engine 9 can be started.

On the other hand, if it is determined by the immobilizer unit that the authentication key does not coincide with the authentication code stored in advance in the immobilizer unit, that is, if it is determined that the key 31 is not unique to the vehicle, then a signal for energizing the solenoid 57 is not issued from the engine control unit 51, and a signal for energizing the coil 60*a* is not issued either.

Whether the lock unit 52 is in the locking state, whether the power supply to the vehicle is turned on by the ignition switch assembly 50, and whether the switch 60*b* is on in this manner are each respectively indicated by the indicator 64.

While, in the ignition switch apparatus arrangement structure described above, the ignition switch apparatus 30 is provided on the pivot plate 10, and since the pivot plate 10 supports the rear wheel 12 as a driving wheel through the rear swing arm 11, it is formed with an increased width compared to other components, due to the necessity to assure a high rigidity thereof. Since the ignition switch apparatus 30 is provided on the pivot plate 10 having an increased width in this manner, the degree of freedom in attachment of the ignition switch apparatus 30 is increased, when compared with that in the conventional case wherein the ignition switch apparatus 30 is provided on the main frame section 21.

Further, since the pivot plate 10 is disposed at a position spaced away from the engine 9, particularly from a cylinder head 9*a* that exhibits the highest temperature, also the ignition switch apparatus 30 is inevitably disposed at a position spaced away from the engine 9. As a result, the ignition switch apparatus 30 is not as likely to be influenced by heat from the engine 9, and besides is not likely to be influenced by electrical noise interference from the spark plug of the engine 9. In addition, since the pivot plate 10 has an increased width, as described above, and besides has a great depthwise dimension, the wiring system for the power supply and related components of the ignition switch apparatus 30 is better protected.

Further, since the antenna 34 of the ignition switch apparatus 30 is provided such that it projects outwardly from the outer face Sa of the recessed portion 10*a* of the pivot plate 10, magnetic fluxes from the antenna 34 or magnetic fluxes from the transponder 33 are not interfered with, or intercepted by the pivot plate 10. As a result, good communication between the key 31 and the ignition switch apparatus 30 is promoted.

Further, since the inner end portion 34*a* of the antenna 34 of the ignition switch apparatus 30 is disposed on the plane same as the outer face Sa of the recessed portion of the pivot plate 10, the projection amount M of the antenna 34 from the outer face Sa of the pivot plate 10 can be restricted to the minimum. Consequently, while a good communication state between the antenna 34 and the key 31 is assured, it can be satisfied simultaneously to prevent the ignition switch apparatus 30 itself from being formed in an increased scale. In addition, the projection amount M of the ignition switch apparatus 30 from the outer face Sa of the recessed portion 10*a* of the pivot plate 10 can be minimized.

Further, since the side portion of the antenna 34 of the ignition switch apparatus 30 is covered with the extension portion 44 of the cover 41, which covers the circumference of the ignition switch apparatus 30, the antenna 34 can be sufficiently protected.

Further, while the cover 41 covers the circumference of the ignition switch apparatus 30, since it simultaneously and integrally also covers portions of the pivot plate 10 which are adapted to be situated proximate the driver's legs, the driver's legs do not contact the pivot plate 10, but instead, directly contact the cover 41.

It is to be noted that such a high strength as is demanded for the pivot plate 10 is not demanded for the cover 41, and therefore the cover 41 is normally made of a flexible material having a low rigidity such as a plastic resin.

Further, since the antenna 34 of the ignition switch apparatus 30 not only performs transmission and reception, for example, for verification of an ID code to and from the transponder 33 of the key 31, but also acts as a coil for inducing electric power for the transponder 33, that is, since the antenna 34 not only performs transmission and reception for verification of an ID code but also performs a function as a generator for the transponder 33 of the key 31, the number of necessary parts can be reduced, and also the cost can be reduced compared with that of an alternative case, wherein parts for exclusive use for transmission and reception and for generation of electricity are provided separately.

In addition, in the present embodiment, the recessed portion 10*a* which is depressed by one stage from the other portion of the pivot plate 10 is provided at an upper portion of the front end of the pivot plate 10 and the ignition switch apparatus 30 is disposed in the recessed portion 10*a* in such a state that it is inserted in the hole 28 while the head portion of the ignition switch apparatus 30 is disposed at a position at a substantially equal level to the other outer face Sb different from the recessed portion 10*a* of the pivot plate 10 or at a position depressed from the outer face Sb, the antenna 34 of the ignition switch apparatus 30 can be protected also in this regard.

For example, while, in the embodiment described above, the ignition switch apparatus 30 is provided on the pivot plate 10 of the vehicle body frame 2, the location of the ignition switch apparatus 30 is not limited to this, but the ignition switch apparatus 30 may be provided on the vehicle body frame 2 positioned within a region below the main seat 15 between the rear end of the engine 9 and a rear wheel axle 12*a* on which the rear wheel 12 is supported such as the seat rail 22 or the reinforcement pipe 23.

Further, while, in the embodiment described above, the ignition switch assembly 50 is described taking an ignition switch assembly of the type which cooperates with an immobilizer unit to form an antitheft lock system as an example, the ignition switch assembly 50 is not limited to that of the type described, but the present invention can be applied also where an ignition switch apparatus for an ordinary ignition switch assembly which performs only an on/off operation of a vehicle is disposed.

As described in detail above, according to the present invention, the following effects are exhibited.

According to the arrangement structure for a motorcycle ignition switch apparatus as set forth in the first aspect hereof, since the pivot plate is formed with an increased width from the necessity to assure a high rigidity in order to support the driving wheel and the ignition switch apparatus is provided on the pivot plate of the increased width, the degree of freedom in attachment of the ignition switch apparatus is raised.

Since the pivot plate is disposed at a position spaced away from the engine, the ignition switch apparatus is inevitably disposed at a position spaced away from the engine. As a result, the ignition switch apparatus is less likely to be influenced by heat of the engine and besides is less likely to be influenced by electrical interference from the spark plug of the engine as well.

Further, since the pivot plate has the increased width and besides has a great depth as described above, the protection of a wiring system for the power supply and related components against the ignition switch apparatus is improved.

According to the arrangement structure for a motorcycle ignition switch apparatus as set forth in the second aspect hereof, since the antenna projects from the outer face of the pivot plate, a good communication state with the key is assured. Incidentally, the pivot plate is normally made of a metal such as aluminum or steel, and if the antenna is disposed on the inner side of the pivot plate made of such a metal as just described, magnetic fluxes from the antenna are intercepted by the pivot plate. Consequently, a good communication state between the ignition switch apparatus and the key cannot be achieved.

According to the arrangement structure for a motorcycle ignition switch apparatus as set forth in the third aspect hereof, while the antenna is disposed such that it projects from the outer face of the pivot plate, the projection amount thereof can be suppressed to the minimum. Therefore, to supply necessary magnetic fluxes to the key and to prevent increase in scale of the ignition switch apparatus itself can be satisfied simultaneously. In addition, the projection amount of the ignition switch apparatus from the outer face of the pivot plate can be suppressed to the minimum.

According to the arrangement structure for a motorcycle ignition switch apparatus as set forth in the fourth aspect hereof, since the side portion of the antenna is covered with the extension portion of the cover, the antenna can be protected.

According to the arrangement structure for a motorcycle ignition switch apparatus as set forth in the fifth aspect hereof, the driver's legs do not contact the pivot plate but directly contact the cover that covers the pivot plate. It is to be noted that such a high strength as is demanded for the pivot plate is not demanded for the cover and therefore the cover is normally made of a flexible material having a low rigidity such as a resin.

According to the arrangement structure for a motorcycle ignition switch apparatus as set forth in the sixth aspect hereof, the antenna performs transmission and reception, for example, for verification of an IC code to and from the key but also performs a function for electric generation to the transponder of the key. Accordingly, reduction of the number of parts can be achieved and also reduction of the cost can be achieved when compared with that of an alternative case wherein parts for exclusive use for transmission and reception and for generation of electricity are provided separately.

According to the arrangement structure for a motorcycle ignition switch apparatus as set forth in the seventh aspect hereof, the region below the seat between the rear end of the engine and the rear wheel axle is much wider than the main frame section of the vehicle body frame, and where the ignition switch apparatus is disposed on the vehicle body frame in the region, the degree of freedom in attachment of the ignition switch apparatus is raised when compared with that in an alternative case wherein the ignition switch apparatus is disposed on the main frame section. Further, since the region is spaced far away from the engine, the ignition switch apparatus is less likely to be influenced by heat of the engine and besides is less likely to be influenced by electrical interference from an spark plug of the engine as well.

Although the present invention has been described herein with respect to specific illustrative embodiments thereof, the foregoing description is intended to be illustrative, and not restrictive. Those skilled in the art will realize that many modifications of the embodiments could be made which would be operable. All such modifications that are within the scope of the claims are intended to be within the scope and spirit of the invention.

Having thus, described the invention, what is claimed is:

1. An arrangement structure for an ignition switch apparatus provided for switching vehicle power on and off in a motorcycle, wherein said ignition switch apparatus is operatively attached to a pivot plate of a vehicle body frame, on which a driving wheel is supported, and wherein said ignition switch apparatus is positioned rearward of an engine of the motorcycle.

2. An arrangement structure for a motorcycle ignition switch apparatus according to claim 1, wherein said ignition switch apparatus includes an antenna for performing radio communication for authentication with a transponder built in a key to be inserted into said ignition switch apparatus, and said antenna is provided in such a manner as to project outwardly beyond an outer face of said pivot plate.

3. An arrangement structure for a motorcycle ignition switch apparatus according to claim 2, wherein an inner end portion of said antenna is substantially aligned with the outer face of said pivot plate.

4. An arrangement structure for a motorcycle ignition switch apparatus according to claim 2, further wherein said antenna acts as a coil which induces electric power for said transponder.

5. An arrangement structure for a motorcycle ignition switch apparatus according to claim 1, further comprising a cover for covering a circumference of said ignition switch apparatus, and wherein said cover has an extension portion which covers side faces of said antenna.

6. An arrangement structure for a motorcycle ignition switch apparatus according to claim 5, wherein said cover also covers portions of said pivot plate which are adapted to be situated proximate a driver's legs.

7. An arrangement structure for an ignition switch apparatus for switching vehicle power on and off in a motorcycle, wherein said ignition switch apparatus is disposed below a seat on a vehicle body frame, in a region rearward of an engine and forward of a rear wheel axle.

8. A frame structure for a motorcycle, comprising:

a main frame section, a pivot plate attached to the main frame section, a rear swing arm pivotally connected to the pivot plate, and an ignition switch apparatus operatively attached to the pivot plate.

9. The frame structure of claim 8, wherein the pivot plate has a hole formed therein, and wherein a portion of said ignition switch apparatus extends through said hole.

10. The frame structure of claim 9, wherein the ignition switch apparatus comprises a lock cylinder and a cylindrical collar surrounding a portion of said lock cylinder, wherein part of said cylindrical collar extends through the hole in said pivot plate.

11. The frame structure of claim 8, further comprising a key for inserting into said ignition switch apparatus, said key comprising a radio transponder, and wherein said ignition switch apparatus comprises an antenna for radio communication with said transponder.

12. The frame structure of claim 11, wherein said antenna acts as a coil which induces electric power for said transponder.

13. The frame structure of claim 8, wherein an inner end portion of said antenna is substantially aligned with the outer face of said pivot plate.

14. The frame structure of claim 8, further comprising a cover for covering a circumference of said ignition switch apparatus, and wherein said cover has an extension portion which covers side faces of said antenna.

15. The frame structure of claim 14, wherein said cover also covers portions of said pivot plate which are adapted to be situated proximate a driver's legs.

16. The frame structure of claim 8, wherein the ignition switch apparatus is positioned on the pivot plate so as to lie rearward of an engine of the motorcycle.

17. The frame structure of claim 8, wherein the pivot plate has a through hole formed in an outwardly facing surface thereof, and a portion of said ignition switch apparatus extends through said through hole so that a portion of the ignition switch apparatus resides within the through hole.

the ignition switch apparatus comprises a lock cylinder and a cylindrical collar surrounding a portion of said lock cylinder, and wherein part of said cylindrical collar extends through the through hole in said pivot plate.

18. A motorcycle comprising a frame structure wherein the frame structure comprises:

a main frame section, a pivot plate attached to the main frame section, a rear swing arm pivotally connected to the pivot plate, and an ignition switch apparatus attached to the pivot plate.

* * * * *